US007449674B2

(12) United States Patent
Ueno et al.

(10) Patent No.: US 7,449,674 B2
(45) Date of Patent: Nov. 11, 2008

(54) OPTICAL TRANSMISSION MODULE

(75) Inventors: Osamu Ueno, Kanagawa (JP); Shigemi Ohtsu, Kanagawa (JP); Shinya Kyozuka, Kanagawa (JP); Kazuhiro Sakai, Kanagawa (JP); Osamu Ohtani, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 25 days.

(21) Appl. No.: 11/580,655

(22) Filed: Oct. 13, 2006

(65) Prior Publication Data
US 2007/0267569 A1 Nov. 22, 2007

(30) Foreign Application Priority Data
May 17, 2006 (JP) ............... 2006-137955

(51) Int. Cl.
G02B 6/36 (2006.01)
G02B 6/42 (2006.01)

(52) U.S. Cl. ............... 250/227.24; 250/227.11; 385/88

(58) Field of Classification Search ........ 250/216, 250/239, 208.2, 227.11, 227.24; 385/12, 385/13, 15, 31, 33–35, 39, 52, 88, 92, 93; 257/81, 88, 431–434, 443, 678
See application file for complete search history.

(56) References Cited

U.S. PATENT DOCUMENTS

| | | | | |
|---|---|---|---|---|
| 4,625,333 A * | 11/1986 | Takezawa et al. | ........... | 398/139 |
| 5,337,398 A * | 8/1994 | Benzoni et al. | ............... | 385/90 |
| 5,434,939 A * | 7/1995 | Matsuda | ...................... | 385/88 |
| 5,774,616 A * | 6/1998 | Matsuda | ...................... | 385/89 |
| 5,909,524 A | 6/1999 | Tabuchi | | |
| 6,527,455 B2 * | 3/2003 | Jian | ........................... | 385/88 |
| 6,597,713 B2 * | 7/2003 | Ouchi | ......................... | 372/36 |
| 6,908,232 B2 * | 6/2005 | McColloch et al. | ........... | 385/53 |
| 6,932,516 B2 * | 8/2005 | Ouchi et al. | ................... | 385/88 |
| 6,942,396 B2 * | 9/2005 | Marion et al. | ................. | 385/90 |
| 6,953,291 B2 * | 10/2005 | Liu | .............................. | 385/94 |
| 7,323,263 B2 * | 1/2008 | Cargnelli et al. | .............. | 429/22 |
| 2002/0025122 A1 * | 2/2002 | Ouchi et al. | ................... | 385/88 |
| 2002/0102060 A1 * | 8/2002 | Jewell et al. | .................. | 385/49 |
| 2002/0126964 A1 * | 9/2002 | Blom et al. | .................... | 385/88 |
| 2003/0113071 A1 * | 6/2003 | Kim et al. | ..................... | 385/76 |
| 2004/0008952 A1 * | 1/2004 | Kragl | ........................... | 385/88 |
| 2004/0077139 A1 | 4/2004 | Silverbrook | | |
| 2004/0184707 A1 | 9/2004 | Jewell et al. | | |

(Continued)

FOREIGN PATENT DOCUMENTS

EP 0121402 10/1984

(Continued)

Primary Examiner—John R Lee
(74) Attorney, Agent, or Firm—Fildes & Outland, P.C.

(57) ABSTRACT

An optical transmission module includes: a substrate; an electric wiring section that is provided on the substrate; a photoelectric element that are mounted on the electric wiring section, and that emits an optical signal on the basis of a received electric signal or transmits an electric signal on the basis of a received optical signal; an optical part that comprises at least one of an optical conversion section and an optical fiber receptacle section, and that controls an optical path of optical signal between the photoelectric element and an optical fiber; a mounting support member that positions the photoelectric element; and a positioning mechanism that positions the optical part and the mounting support member.

23 Claims, 10 Drawing Sheets

U.S. PATENT DOCUMENTS

| | | | |
|---|---|---|---|
| 2004/0264884 A1* | 12/2004 | Liu | 385/89 |
| 2005/0226569 A1* | 10/2005 | Sashinaka et al. | 385/92 |
| 2005/0259927 A1* | 11/2005 | Kato | 385/93 |

FOREIGN PATENT DOCUMENTS

| | | |
|---|---|---|
| JP | 11-133274 | 5/1999 |
| JP | 2000-199838 | 7/2000 |
| WO | 98/32042 | 7/1998 |
| WO | 02/054129 | 7/2002 |
| WO | 2006/047896 | 5/2006 |

\* cited by examiner

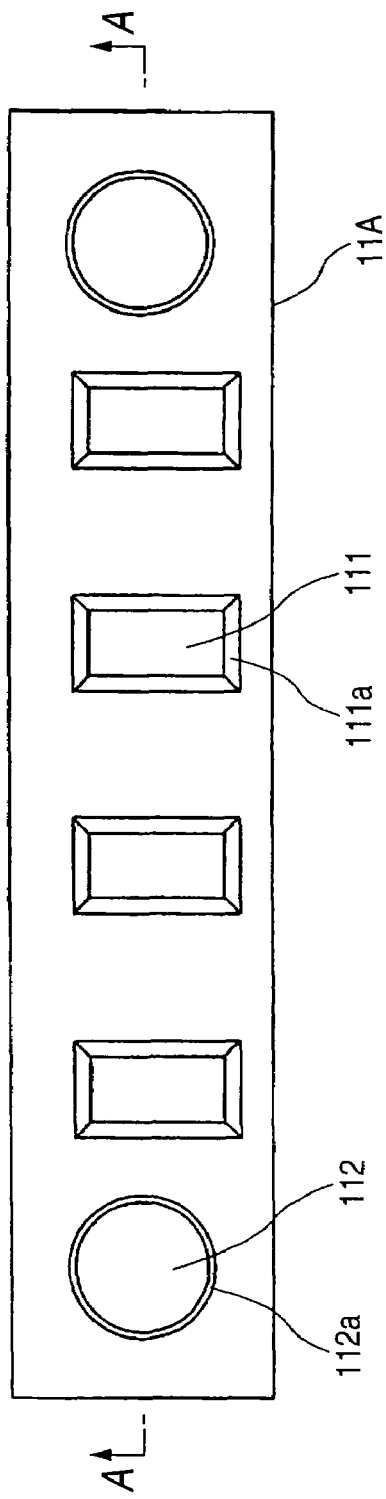
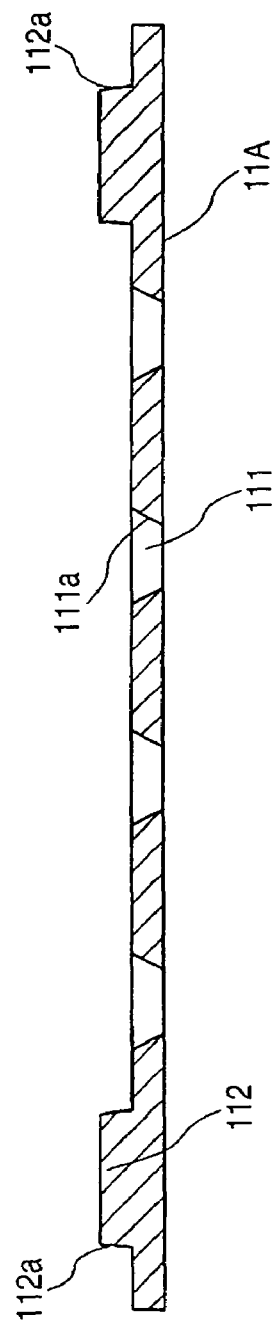
FIG. 2A
FIG. 2B

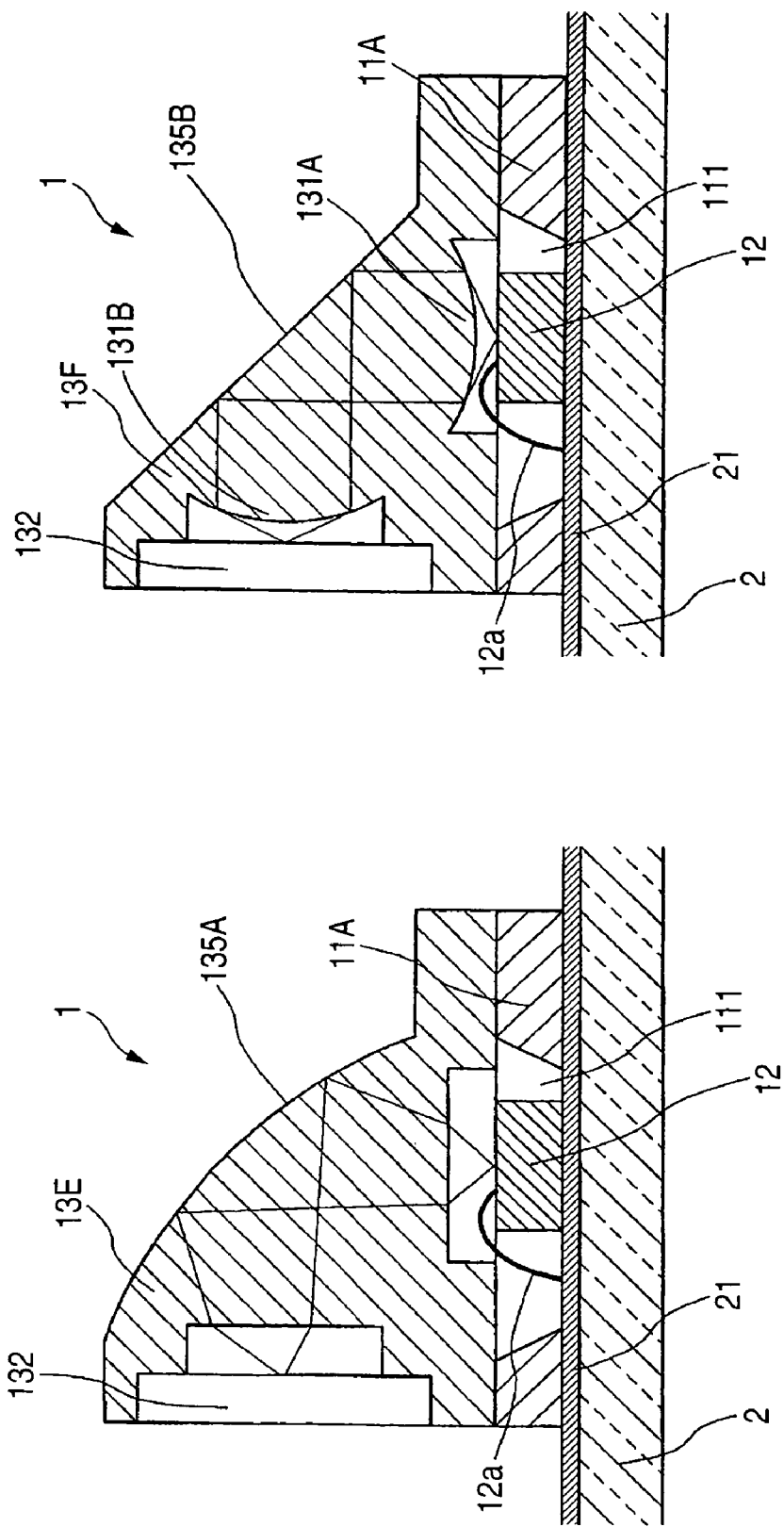

OPTICAL TRANSMISSION MODULE

BACKGROUND

1. Technical Field

The present invention relates to an optical transmission module and a method of manufacturing the same, particularly an optical transmission module in which positioning between a photoelectric element and an optical fiber can be achieved precisely and easily, and reduction in size and cost can be realized.

2. Related Art

A conventional optical transmission module is provided with a plurality of photoelectric elements such as light emitting elements or light receiving elements. In the optical transmission module, positioning of the photoelectric element and an optical fiber has been a serious problem.

When one photoelectric element is provided, the photoelectric element is housed in a metallic can package such as a TO (Transistor Outline) can package, and a so-called active alignment is performed in which positioning between the photoelectric element and an optical fiber receptacle section is performed in a state where the photoelectric element emits light or receives light.

SUMMARY

In order to achieve the object, one embodiment of the invention provides the following optical transmission module and the method of manufacturing the same.

According to an aspect of the present invention, an optical transmission module comprising: a substrate; an electric wiring section that is provided on the substrate; a photoelectric element that are mounted on the electric wiring section, and that emits an optical signal on the basis of a received electric signal or transmits an electric signal on the basis of a received optical signal; an optical part that comprises at least one of an optical conversion section and an optical fiber receptacle section, and that controls an optical path of optical signal between the photoelectric element and an optical fiber; a mounting support member that positions the photoelectric element; and a positioning mechanism that positions the optical part and the mounting support member.

In accordance with this aspect, the photoelectric element is positioned by the mounting support member, and the mounting support member and the optical part are positioned by the positioning mechanism. Accordingly, the photoelectric element and the optical part can be positioned precisely and easily through the mounting support member.

BRIEF DESCRIPTION OF THE DRAWINGS

Exemplary embodiment of the present invention will be described in detail based on the following figures, wherein:

FIGS. 2A and 2B are diagrams illustrating the structure of a mounting support member according to a first embodiment of the invention;

FIGS. 9A and 9B are sectional views illustrating the structure of an optical transmission module according to a seventh embodiment of the invention.

DETAILED DESCRIPTION

First Embodiment

Figure 1:
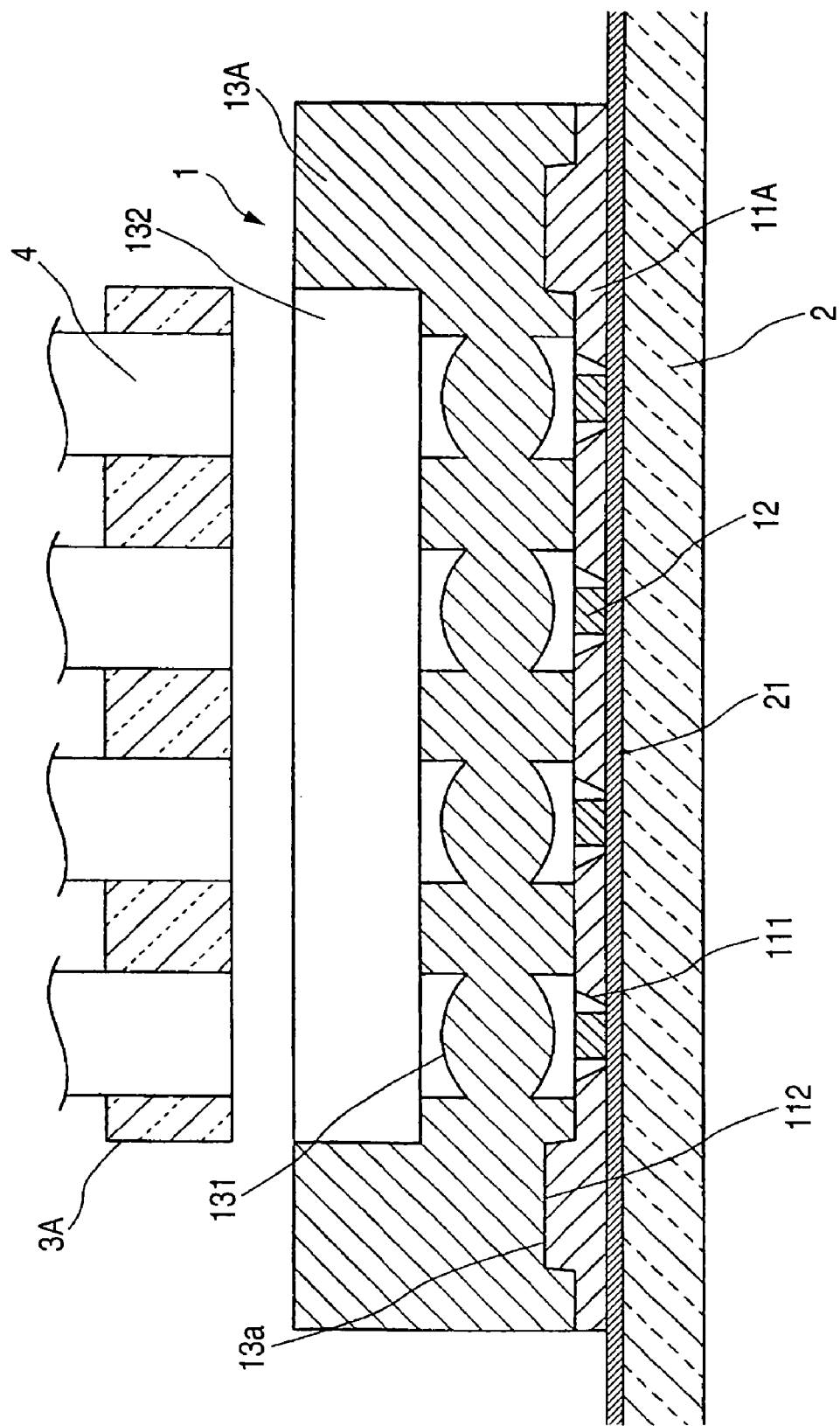
FIG. 1 is a sectional view illustrating the construction of an optical transmission module according to a first embodiment of the present invention.

FIG. 1 is a sectional view illustrating the construction of an optical transmission module according to a first embodiment of the invention.

The optical transmission module 1 includes a mounting support member 11A, a plurality of photoelectric elements 12, and an optical part 13A. The mounting support member 11A is provided on an electric wiring section 21 disposed on a substrate 2.

(Electric Wiring Section)

The electric wiring section 21 is an electric wiring part such as a printed circuit board, a flexible printed circuit board, a lead frame wiring lines or the like. The electric wiring section 21 is disposed on the substrate 2 in advance.

(Mounting Support Member)

The mounting support member 11A makes it possible to dispose the photoelectric element 12 in an optimal position on the electric wiring section 21 and to install the optical part 13A in an optimal position in the positional relationship with the photoelectric element 12.

The mounting support member 11A is provided with a plurality of element positioning sections 111 and a plurality of optical part positioning sections 112. The element positioning section 111 is used in positioning for disposing the photoelectric element 12 on an optimal position of the electric wiring section 21, in order to connect the photoelectric element 12 to the electric wiring section 21.

The optical part positioning section 112 is a convex portion (first convex portion) provided on the upper surface of the mounting support member 11A. The optical part positioning section 112 is fitted into a concave portion (second concave portion) 13a provided in the optical part 13A, so that the optical part 13A can be fixed in a suitable position.

(Photoelectric Element)

The photoelectric element 12 is a light emitting element such as a light emitting diode or surface emitting laser, which converts an electric signal into an optical signal. When receiving an electric signal delivered through the electric wiring section 21, the photoelectric element 12 emits a corresponding optical signal to deliver to optical fiber (not shown) through the optical part 13A. Alternatively, the photoelectric element 12 may be a light receiving element, such as a photodiode, which receives an optical signal emitted from the optical fiber (not shown) through the optical part 13A and converts the optical signal into an electrical signal to return.

Further, as for the plurality of photoelectric elements 12 on the substrate 2, light emitting elements and light receiving elements may be used.

As for the photoelectric element 12, a light emitting element, such as surface emitting laser, or a light receiving element is used. However, any element, which performs photoelectric conversion, may be used.

(Optical Part)

The optical part 13A includes a plurality of lens sections 131 and an optical fiber receptacle section 132. The optical part 13A has a function of effectively delivering an optical signal emitted from the photoelectric element 12 to the optical fiber 4.

The lens section 131 condenses optical signals, which are diffusely emitted from the photoelectric element 12, and performs photoelectric conversion so that the optical signals effectively enter the optical fiber. Alternatively, when a light receiving element is used as the photoelectric element 12, the lens section condenses optical signals, which are diffusely emitted from the optical fiber, and performs photoelectric conversion so that the optical signals are effectively condensed and received into the photoelectric element 12.

The optical fiber receptacle section 132 fits and fixes one end of a fiber holder 3A holding the optical fiber 4 delivering an optical signal to an optimal position so that an optical signal emitted from the photoelectric element 12 is effectively received and an optical signal received in the photoelectric element 12 is effectively transmitted.

(Detailed Construction of Mounting Support Member)

FIGS. 2A and 2B are diagrams illustrating the detailed structure of the mounting support member according to the first embodiment. FIG. 2A is a top view of the mounting support member 11A and FIG. 2B is a sectional view taken along an A-A line of FIG. 2A.

The mounting support member 11A is a thin plate member having a substantially rectangular shape. The optical part positioning section 112 having a convex shape is provided on either side of the mounting support member 11A in a longitudinal direction. Between two of the optical part positioning sections 112, the plurality (four in FIG. 2) of element positioning sections 111 are provided, having a width for positioning a width direction of the photoelectric element 12.

The element positioning section 111 is a hole provided through the plane-shaped mounting support member 11A. When the mounting support member 11A is disposed on the electric wiring section 21, the electric wiring section 21 is exposed through the element positioning section 111 without being covered by the mounting support member 11A. Therefore, when the photoelectric element 12 is disposed in the element positioning section 111, the electric connection between the photoelectric element 12 and the electric wiring section 21 can be achieved.

The wall surface of the element positioning section 111 is formed with an inclined surface 111a. Therefore, when the photoelectric element 12 is mounted, mechanical interference hardly occurs. Such a structure makes mounting easy.

A taper 112a is formed at the side of the optical part positioning section 112 so that the optical part 13A is easily fitted.

(Manufacturing Process of the First Embodiment)

Figure 3A:
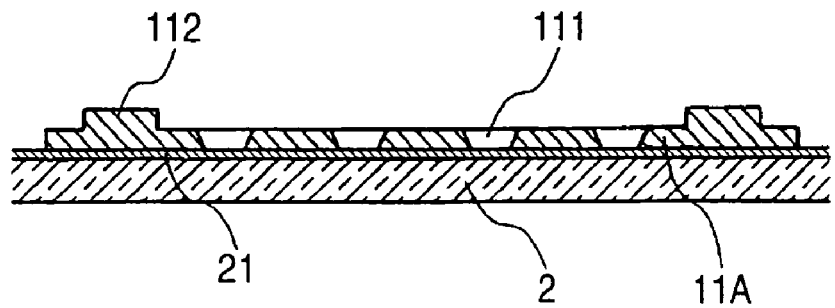
FIGS. 3A to 3F are diagrams illustrating a process of manufacturing an optical transmission module according to the first embodiment of the invention.
Figure 3B:
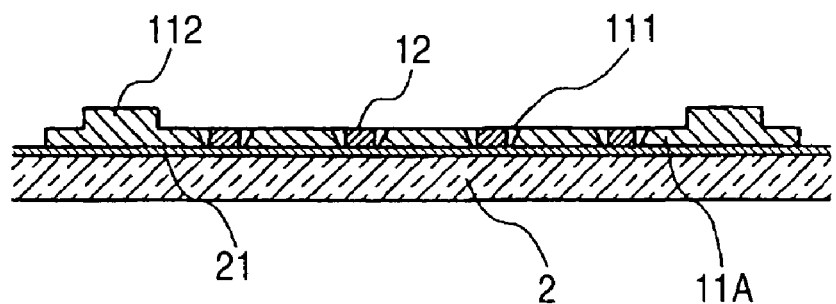
Figure 3C:
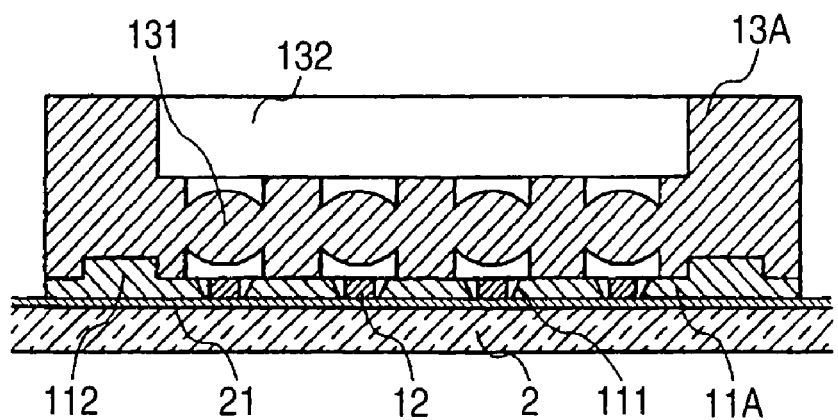
Figure 3D:
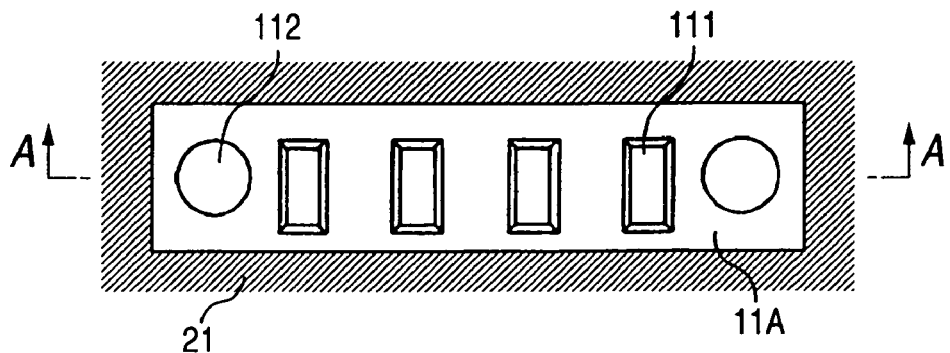
Figure 3E:
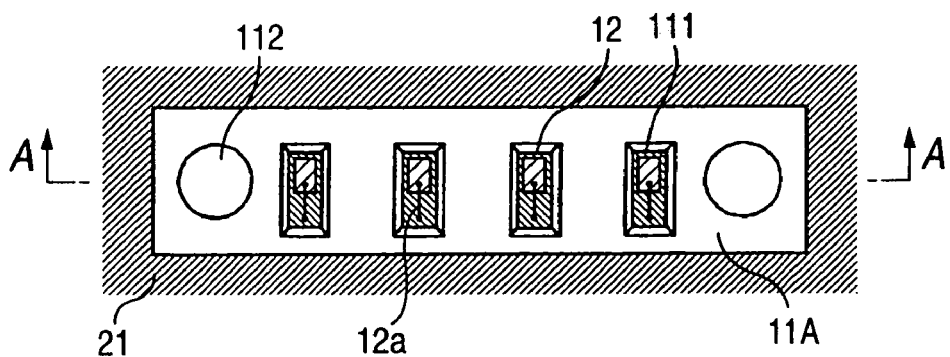
Figure 3F:
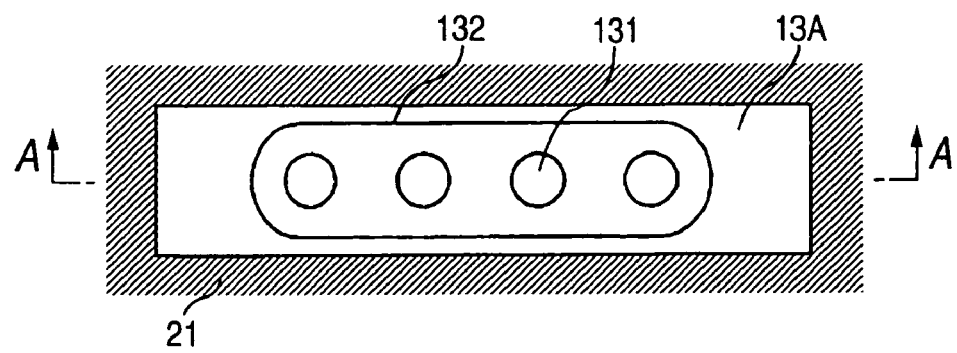

FIGS. 3A to 3F are diagrams illustrating a process of manufacturing an optical transmission module according to the first embodiment of the invention. FIGS. 3B, 3D, and 3F are sectional views taken along an A-A line of FIGS. 3A, 3C, and 3E, respectively.

First, the electric wiring section 21 is disposed on the substrate 2. Then, the mounting support member 11A is positioned and fixed in accordance with an electrode pattern of the electric wiring section 21 and other positional information, as shown in FIGS. 3A and 3B.

The electric wiring section 21 is directly disposed on the substrate 2, for example, by a method of printing a circuit board on the substrate 2.

The mounting support member 11A can be formed in a desired shape by resin molding, such as extrusion, or a cutting.

The mounting support member 11A is used for determining an absolute position of the photoelectric element 12 with respect to the electric wiring section 21. However, an absolute position of the photoelectric element 12 with respect to the electric wiring section 21 has a relatively high degree of freedom. Therefore, the mounting precision of the mounting support member 11A with respect to the electric wiring section 21 may be relatively low, and mounting can be performed at a low cost.

Next, as shown in FIGS. 3B and 3E, the plurality of photoelectric elements 12 are disposed using the element positioning section 111 of the mounting support member 11A and fixed to the electric wiring section 21.

The width of one side of the element positioning section 111 composed of a substantially rectangular hole slightly exceeds that of the photoelectric element 12. Further, the photoelectric element 12 is disposed in accordance with the element positioning section of the mounting support member 11A, so that the photoelectric element 12 can be easily disposed in a desired position.

The width of the other side of the element positioning section 111 is relatively larger than that of photoelectric element 12. This is because a space required for connecting an electrode provided on the photoelectric element 12 and the electric wiring section 21 through wire-bonding using wire 12a should be secured.

After the fixing of the photoelectric element 12, the electrode provided on the photoelectric element 12 and the electric wiring section 21 are connected through wire-bonding using the wire 12a. Since heat is generated in the wire-bonding, the mounting support member 11A is preferably formed of a material having resistance to the heat.

The wall surface of the element positioning section 111 is inclined, so that the size of the hole at the upper portion becomes larger than that of the hole at the lower portion, which makes it easy to dispose the photoelectric element 12.

Next, as shown in FIGS. 3C and 3F, the optical part 13A is disposed on the mounting support member 11A. At this time, the disposed position of the optical part 13A is determined using two of the optical part positioning sections 112 of the mounting support member 11A. As the convex-shaped optical part positioning section 112 of the mounting support member 11 is fitted into the concave portion 13a of the optical part 13A, the plurality of lens sections 131 of the optical part 13 are respectively positioned on the corresponding photoelectric elements 12. That is, the plurality of lens sections 131 can be disposed in suitable positions.

The optical part positioning section 112 is provided with the taper 112a so that the optical part 13A is easily fitted into the optical part positioning section 112. Therefore, when the optical part 13A is positioned with respect to the mounting support member 11A, mechanical interference hardly occurs. Such a structure makes mounting easy.

The optical part 13A can be also formed in a desired shape by resin molding, such as extrusion, or a cutting.

The above-described process of manufacturing the optical transmission module according to the first embodiment is commonly applied to optical transmission modules according to other embodiments, which will be described below.

(Effect of the First Embodiment)

According to the first embodiment, the photoelectric element 12 and the optical part 13A are directly positioned with respect to the mounting support member 11A. Therefore, without an intermediate member such as a guide pin, positioning with high precision can be realized. Further, since the thickness of the mounting support member 11A can be set to the thickness level of the photoelectric element 12, the mounting support member can be manufactured at a low cost.

Further, even in the optical fiber receptacle 132, positioning of the optical fiber can be realized without an intermediate member such as a guide pin.

Second Embodiment

An optical transmission module according to a second embodiment of the invention has alignment marks provided in a mounting support member, and the alignment marks are used for determining the disposed position of the photoelectric element 12.

Figure 4A:
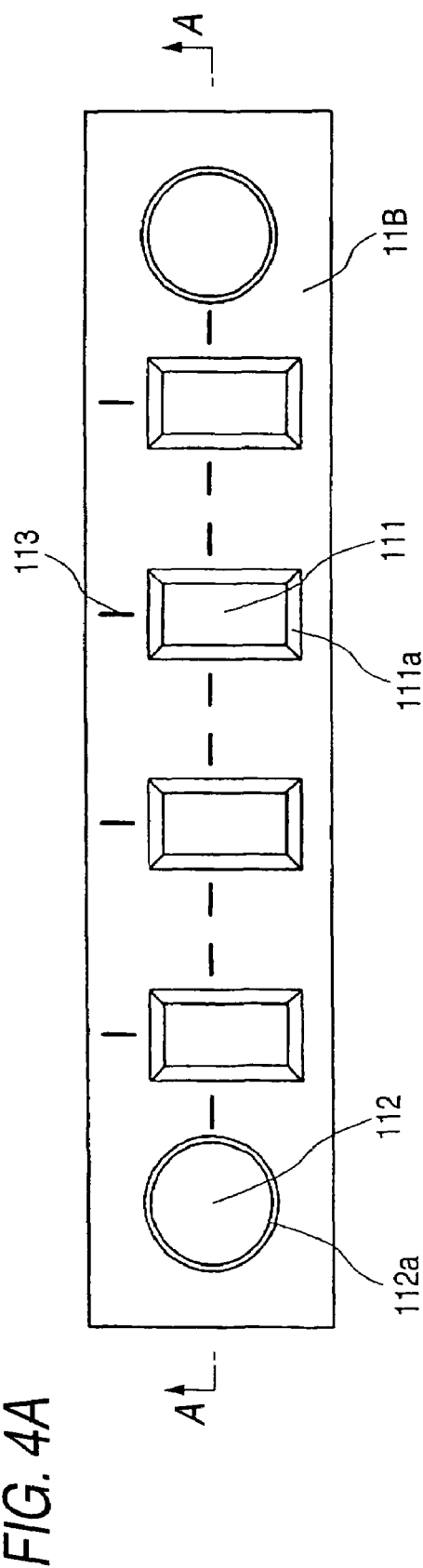
FIGS. 4A and 4B are diagrams illustrating the structure of a mounting support member according to a second embodiment of the invention.
Figure 4B:
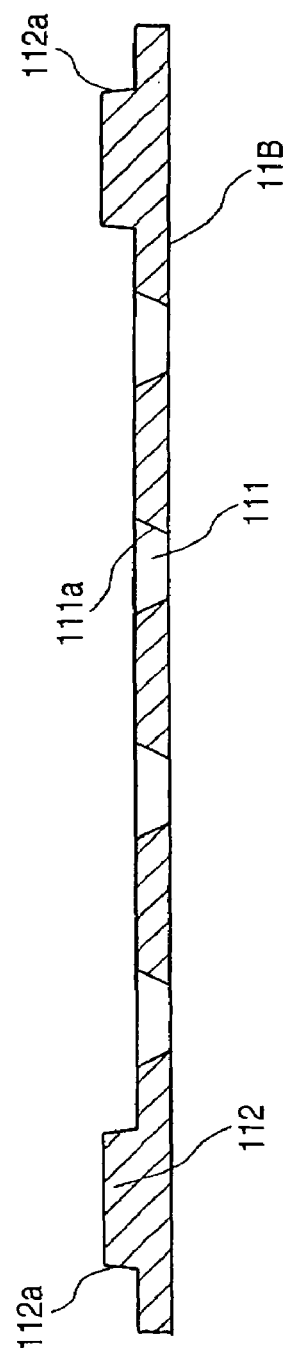

FIGS. 4A and 4B are diagrams illustrating the structure of the mounting support member according to the second embodiment of the invention. FIG. 4A is a top view of the mounting support member 11B, and FIG. 4B is a sectional view taken along a line A-A of FIG. 4A.

The mounting support member 11B according to the second embodiment has something in common with the mounting support member 11A according to the first embodiment in that the mounting support member 11B is a slim plate member having a substantially rectangular shape, the convex-shaped optical part positioning section 112 is provided on either side of the mounting support member 11B in the longitudinal direction, and the plurality of element positioning sections 111 are provided between two of the optical part positioning sections 112. However, the mounting support member 11B is different from the mounting support member 11A in that the alignment marks 113 are provided around each element positioning section 111.

The alignment marks 113 are provided around the plurality of element positioning sections 111 of the mounting support member 11B. The alignment mark is a straight-line mark provided around the element positioning section 111 and is a concave portion, which is provided in advance when the mounting support member 11B is molded.

The plurality of alignment marks 113 are provided around each of the element positioning sections 111. Optical positioning is performed such that a point, where the respective alignment marks 113 intersect each other when they are extended, overlaps the center of the optical element 12. Then, the absolute position of the optical element 12 is determined.

Therefore, the width of the element positioning section 111 in the mounting support member 11B may be relatively larger than that of the optical element 12. Further, the wall surface of the element positioning section 111 does not have to be formed with the inclined surface 111a.

When the photoelectric element 12 is positioned, mechanical positioning using the element positioning section 111 and optical positioning using the alignment marks 113 may be used together.

(Effect of the Second Embodiment)

According to the second embodiment, the photoelectric element 12 and the optical part 13A are directly positioned with respect to the mounting support member 11B. Therefore, without an intermediate member such as a guide pin, positioning with high precision can be realized.

Third Embodiment

An optical transmission module according to a third embodiment of the invention has one array positioning section provided in a mounting support member. The disposed position of an element array including a plurality of photoelectric elements is determined by the array positioning section.

Figure 5A:
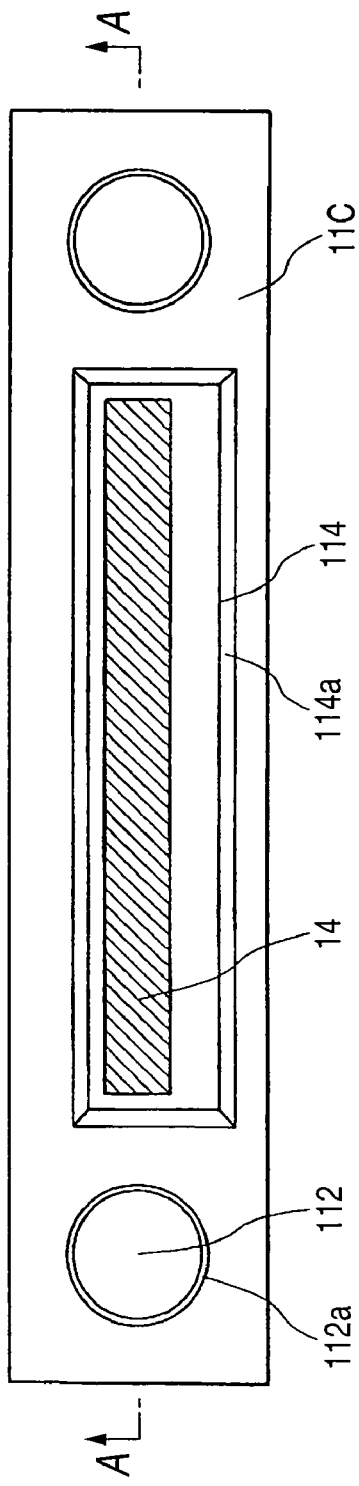
FIGS. 5A and 5B are diagrams illustrating the structure of a mounting support member according to a third embodiment of the invention.
Figure 5B:
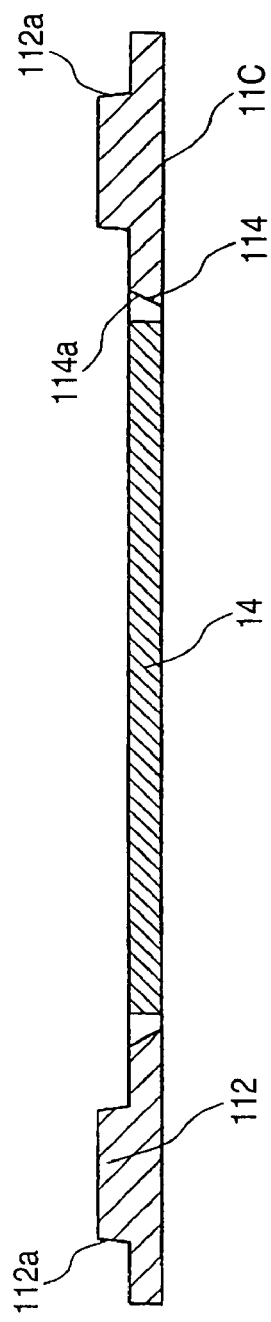

FIGS. 5A and 5B are diagrams illustrating the structure of the mounting support member according to the third embodiment of the invention. FIG. 5A is a top view of the mounting support member 11C, and the FIG. 5B is a sectional view taken along a line A-A of FIG. 5A. FIGS. 5A and 5B shows the element array 14 disposed inside the array positioning section 114.

In the mounting support member 11C, one array positioning section 114 and a plurality (for example, two) of optical part positioning sections 112 are provided. The array positioning section 114 is used in positioning for disposing the element array 14 on an optimal position of the electric wiring section 21, in order to connect the element array 14 including the plurality of photoelectric elements to the electric wiring section 21.

The element array 14 is where a plurality of photoelectric elements converting an electric signal into an optical signal are arranged. When the respective photoelectric elements receive an electric signal delivered through the electric wiring section 21, the element array 14 emits a corresponding optical signal to deliver to the optical fiber 4 (not shown) through the optical part 13A. When a light receiving element is used as a photoelectric element, the respective photoelectric elements receive an optical signal emitted from the optical fiber 4 (not shown) through the optical part 13A and return the optical signal into an electric signal.

As for the photoelectric element included in the element array 14, a light emitting element such as surface emitting laser or a light receiving element is used. However, any element which performs photoelectric conversion may be used.

The mounting support member 11C is a slim plate member having a substantially rectangular shape. The convex-shaped optical part positioning section 112 is provided on either side of the mounting support member 11C in a longitudinal direction. Further, between two of the optical part positioning sections 112, one rectangular array positioning section 114 is provided.

The array positioning section 114 is a hole provided in the plane mounting support member 11C. When the mounting support member 11C is disposed on the electric wiring section 21, the electric wiring section 21 is exposed through the array positioning section 114 without being covered by the mounting support member 11C. Therefore, when the element array 14 is disposed in the array positioning section 114, the electric connection between the element array 14 and the electric wiring section 21 can be achieved.

The wall surface of the array positioning section 114 is formed with an inclined surface 114a. When the element array 114 is mounted, mechanical interference hardly occurs. Therefore, such a structure makes mounting easy.

In the above-described third embodiment, alignment marks are not used in positioning the element array 14. However, alignment marks may be used for positioning the element array 14.

(Effect of the Third Embodiment)

According to the third embodiment, the element array 14 and the optical part 13A are directly positioned with respect to the mounting support member 11C. Therefore, without an intermediate member such as a guide pin, positioning with high precision can be realized.

Fourth Embodiment

An optical transmission module according to the fourth embodiment of the invention has a plurality of guide pins provided in the side of an optical fiber receptacle provided in an optical part. The guide pin is used for the connection between the optical part and the optical fiber.

Figure 6:
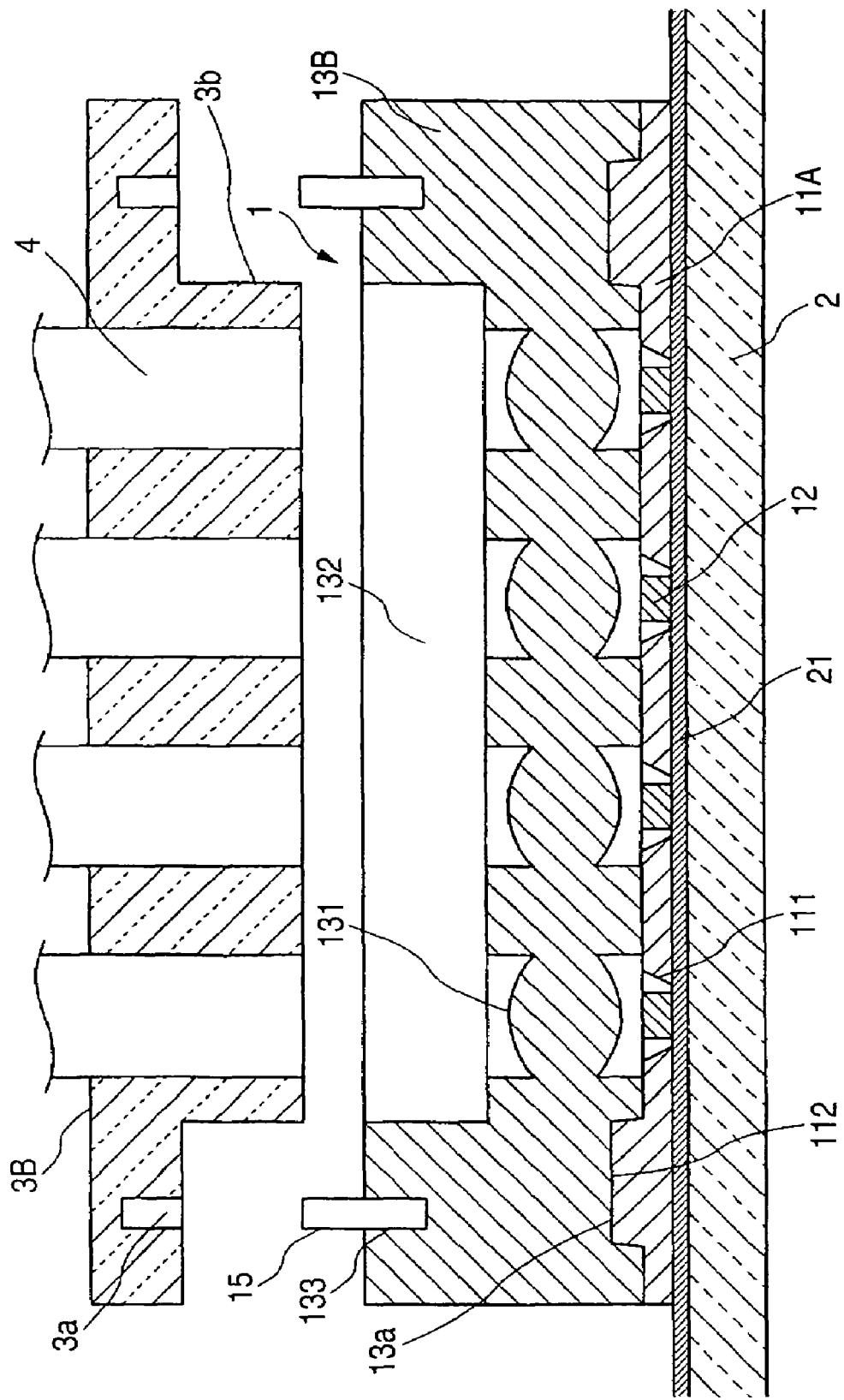
FIG. 6 is a sectional view illustrating the structure of an optical transmission module according to a fourth embodiment of the invention.

FIG. 6 is a sectional view illustrating the structure of the optical transmission module according to the fourth embodiment of the invention.

The optical transmission module 1 according to the fourth embodiment includes a mounting support member 11A, a plurality of photoelectric elements 12, the optical part 13B, and the plurality of guide pins 15. The mounting support member 11A is provided on the electric wiring section 21 disposed on the substrate 2. The mounting support member 11A and the photoelectric elements 12 are the same as those of the first embodiment.

The optical part 13B includes a plurality of lens sections 131, the optical fiber receptacle section 132, and a plurality of guide pin insertion holes (third concave portions) 133. The optical part 13B has a function of effectively delivering an optical signal emitted from the photoelectric element 12 to the optical fiber.

The lens section 131 and the optical fiber receptacle section 132 are the same as those of the optical part 13A according to the first embodiment and have the same function.

The guide pin insertion hole 133 is provided at the upper surface of the optical part 13B and at the side of the optical fiber receptacle section 132. The guide pin 15 is inserted into the guide pin insertion hole 133.

After being inserted into the guide pin insertion hole 133, the guide pin 15 is used for connecting the optical fiber 4 (not shown) to the optical fiber receptacle section 132. In this case, a fitting section 3b of the fiber holder 3B holding the plurality of optical fibers 4 is fitted into the optical fiber receptacle 132, and the guide pin 15 is inserted into a pin hole 3a. When the guide pin 15 is inserted into a guide positioned at the side of the receptacle provided at one end of the optical fiber, the fitting section 3b is loosely fitted into the optical fiber receptacle section 132 and is positioned by the guide pin 15. Therefore, the optical fiber 4 is easily inserted into the optical fiber receptacle section 132, and the optical fiber 4 can be stably fixed.

(Effect of the Fourth Embodiment)

According to the fourth embodiment, the photoelectric elements 12 and the optical part 13B are directly positioned with respect to the mounting support member 11A, and the optical fiber 4 is positioned by the guide pin 15. Therefore, positioning with high precision can be realized.

Fifth Embodiment

Figure 7:
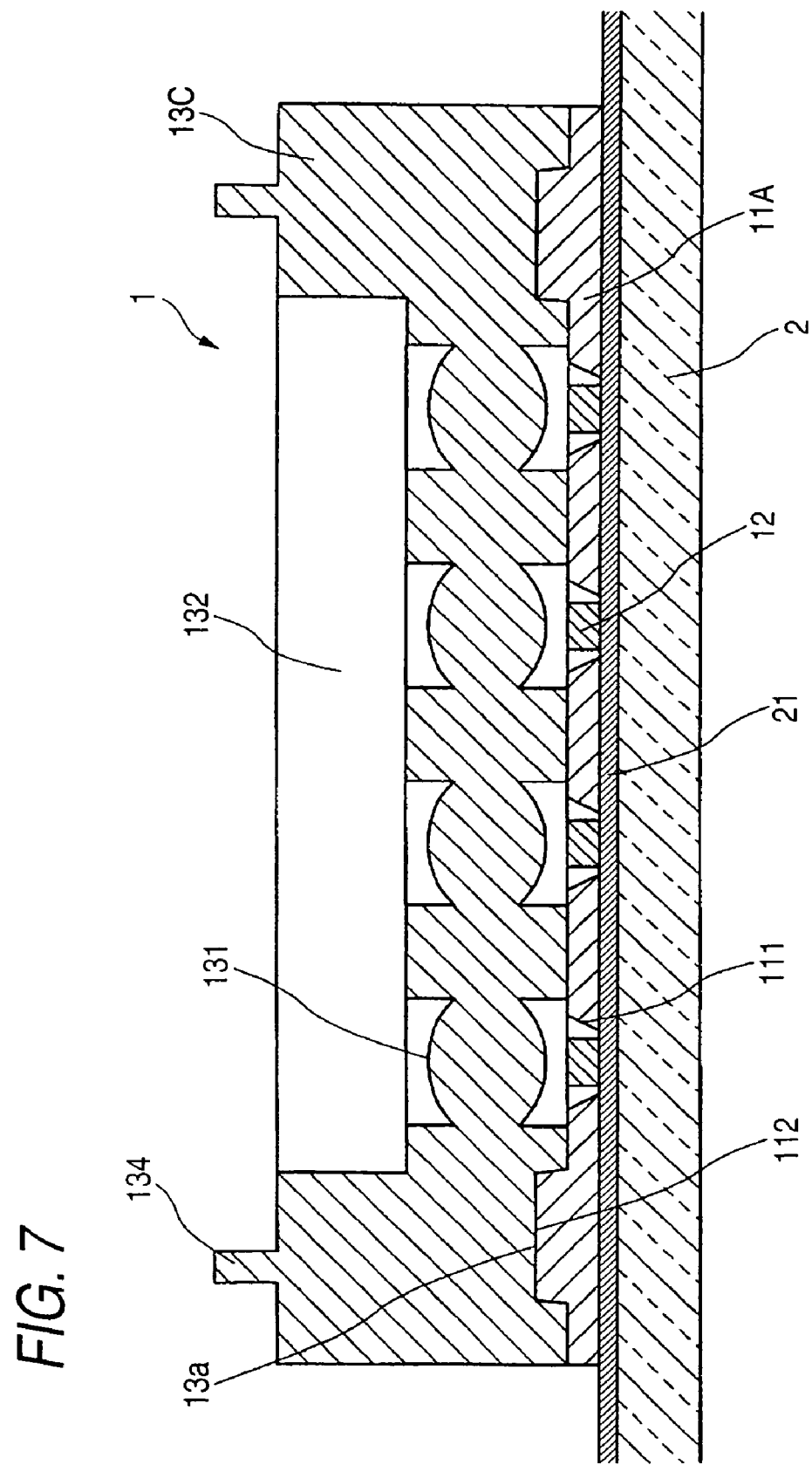
FIG. 7 is a sectional view illustrating the structure of an optical transmission module according to a fifth embodiment of the invention.

FIG. 7 is a sectional view illustrating the construction of an optical transmission module according to a fifth embodiment of the invention. Although the guide pin 15 is inserted into the guide pin insertion hole 133 provided in the optical part 13B in the fourth embodiment, the optical part 13B and the guide pin 15 are integrally formed in this embodiment.

The optical part 13C composing the optical transmission module 1 shown in FIG. 7 has a guide pin 134 provided in the side of an optical fiber receptacle section 132. The guide pin 134 is formed of the same material as the optical part 13C. The guide pin 134 is provided in advance when the optical part 13C is formed. That is, the guide pin 134 and the optical part 13C are integrally formed.

The guide pin 134 has the same function as the guide pin 15 shown in FIG. 6. The guide pin 134 is different from the guide pin 15 only in that the guide pin 134 and the optical part are integrally formed.

When the guide pin is used for fixing the optical fiber to the optical part, the optical fiber receptacle section may be omitted.

(Effect of the Fifth Embodiment)

According to the fifth embodiment, the photoelectric element 12 and the optical part 13C are directly positioned with respect to the mounting support member 11A, and the optical part 13C and the optical fiber 4 are positioned by the guide pin 134. Therefore, positioning with high precision can be realized. Further, the guide pin 134 and the optical part 13C are integrally formed, which makes it easy to manufacture the optical part.

Sixth Embodiment

Figure 8:
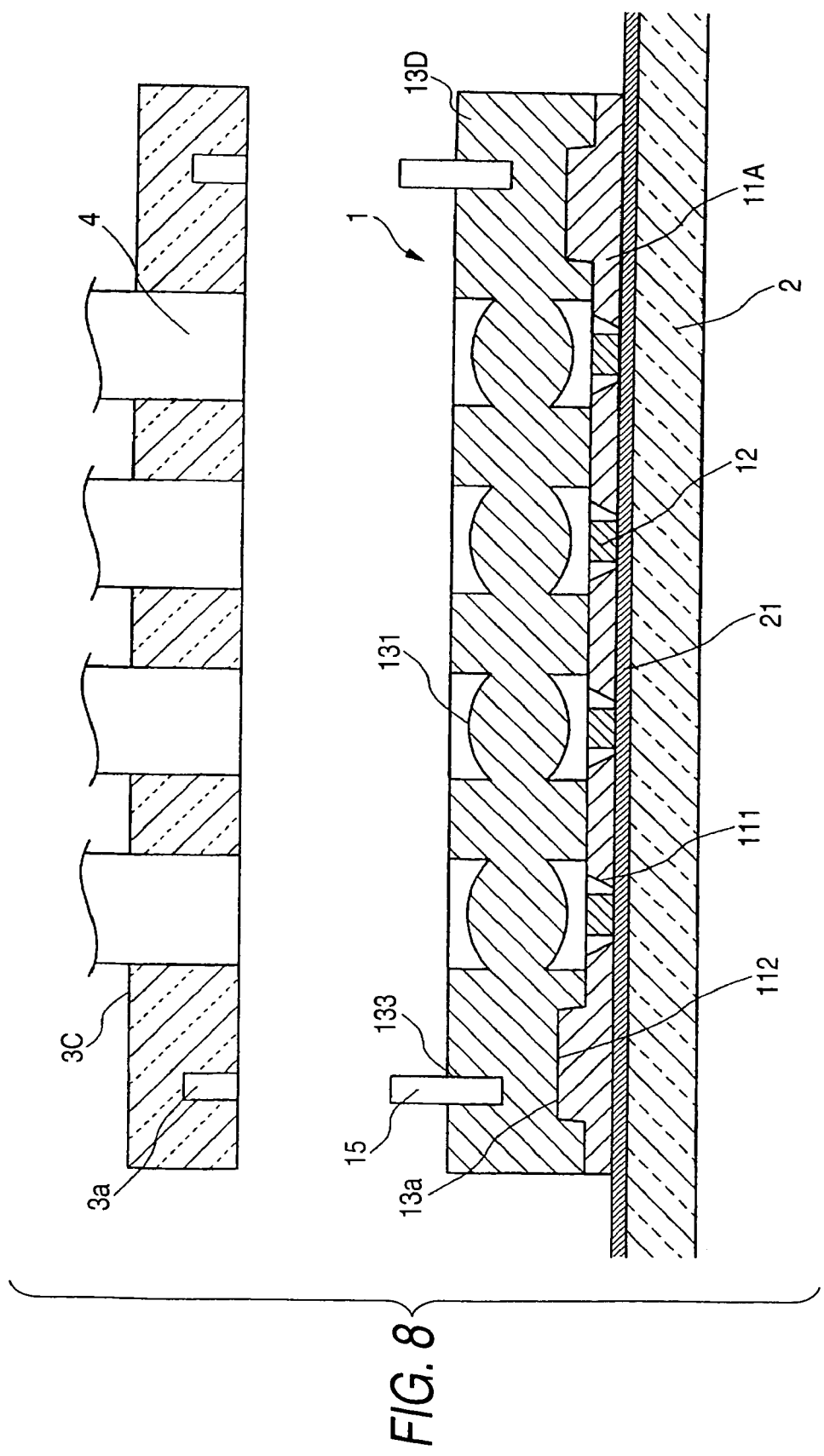
FIG. 8 is a sectional view illustrating the structure of an optical transmission module according to a sixth embodiment of the invention.

FIG. 8 is a sectional view illustrating the construction of an optical transmission module according to a sixth embodiment of the invention. In this embodiment, an optical part includes a guide pin but does not include an optical fiber receptacle section, compared with the fourth embodiment shown in FIG. 6.

The optical part 13D includes the lens section 131 and the guide pin insertion hole 133, but does not include an optical fiber receptacle section. However, the optical fiber can be fixed to the optical part 13D using the guide pin 15.

(Effect of the Sixth Embodiment)

According to the sixth embodiment, the photoelectric elements 12 and the optical part 13D are directly positioned with respect to the mounting support member 11A, and the optical section 13D and the optical fiber 4 are positioned by the guide pin 15. Therefore, without an intermediate member, positioning with high precision can be realized. Further, the optical part 13D does not need to be provided with an optical fiber receptacle member, which makes it easy to manufacture the optical part 13D.

Seventh Embodiment

An optical transmission module according to a seventh embodiment of the invention has a mirror surface provided in an optical part. The mirror surface reflects an optical signal emitted from a photoelectric element in a direction parallel to the substrate surface.

FIGS. 9A and 9B are sectional views illustrating the structure of the optical transmission module according to the seventh embodiment of the invention. FIG. 9A shows the optical transmission module using only the mirror surface without a lens section, and FIG. 9B shows the optical transmission module using the lens section and the mirror surface.

(Optical Part of FIG. 9A)

The optical part 13E shown in FIG. 9A has a concave portion (not shown) where a convex portion of the optical part positioning section 112 provided in the mounting support member 11A is fitted, similar to other embodiments. Further the optical part 13E has a mirror surface 135A which bends an optical signal, which is diffusely emitted from the photoelectric element 12, in a direction parallel to the substrate 2 and condenses light.

In FIG. 9A, the optical signal emitted from the photoelectric element 12 proceeds while being diffused upward. If the optical signal proceeds into the optical part 13E, the diffusion width thereof is suppressed in a relationship of a refractive index.

When the optical signal further proceeds so as to approach the mirror surface 135A, the optical signal is reflected in the horizontal direction. At this time, since the surface mirror 135A is a concave surface mirror, the optical signal which was being diffused proceeds while being converged.

When the optical signal proceeds outside the optical part 13E, the optical signal approaches the optical fiber receptacle section 132 while being further converged due to a change in refractive index. Then, the optical signal is incident on the optical fiber held by a fiber holder (not shown) which is fitted into the optical fiber receptacle section 132.

(Optical Part of FIG. 9B)

The optical part 13F shown in FIG. 9B has a concave portion (not shown) which is fitted into the convex portion of the optical part positioning section 112 provided in the mounting support member 11A, similar to other embodiments. Further, the optical part 13F includes a lens section 131A which changes an optical signal, diffusely emitted from the photoelectric element 12, into parallel light; a mirror surface 135B which bends the parallel light in a direction parallel to the substrate 2; and a lens section 131B which condenses the parallel light reflected by the mirror surface 135B.

In FIG. 9B, the optical signal emitted from the photoelectric element 12 proceeds while being diffused upward. When the optical signal approaches the optical part 13F, the optical signal is refracted by the lens section 131A so as to become parallel light. The parallel light proceeds within the optical part 13F.

If the parallel light further proceeds, the parallel light approaches the mirror surface 135B and is reflected in the horizontal direction. At this time, since the mirror surface 135B is a plane surface mirror, the parallel light is maintained as it is.

Further, when the optical signal proceeds outside the optical part 13E, the optical signal is once again refracted by the lens section 131B and then approaches the optical fiber receptacle section 132 while being converged. Then, the optical signal is incident on the optical fiber held by a fiber holder (not shown) which is fitted into the optical fiber receptacle section 132.

(Effect of the Seventh Embodiment)

According to the seventh embodiment, the photoelectric element 12 and the optical part 13E or 13F are directly positioned with respect to the mounting support member 11A, similar to the first embodiment. Therefore, without an intermediate member such as a guide pin, positioning with high precision can be realized. At the same time, the optical signal can be caused to proceed in the horizontal direction, without increasing the number of parts.

Other Embodiments

The present invention is not limited to the above-described embodiments, but modifications can be made without departing from the scope of the invention. Further, the components of the respective embodiments can be arbitrarily combined without departing from the scope of the invention.

In the above-described embodiments, the optical part is provided with the optical fiber receptacle section and the lens section. However, the optical part may be provided with only one of the optical fiber receptacle section and the lens section.

What is claimed is:

1. An optical transmission module comprising:
   a substrate;
   an electric wiring section that is provided on the substrate;
   a photoelectric element that is mounted on the electric wiring section, and that emits an optical signal on the basis of a received electric signal or transmits an electric signal on the basis of a received optical signal;
   an optical part that comprises at least one of an optical conversion section and an optical fiber receptacle section, and that controls an optical path of optical signal between the photoelectric element and an optical fiber;
   a mounting support member that positions the photoelectric element on the electric wiring section; and
   a positioning mechanism that positions the optical part relative to the mounting support member.

2. The optical transmission module according to claim 1, wherein
   the photoelectric element and the mounting support member are mounted on an upper surface of the electric wiring section, and
   the optical part is mounted on the mounting support member.

3. The optical transmission module according to claim 1, wherein the photoelectric element emitting the optical signal is a surface emitting laser.

4. The optical transmission module according to claim 1, wherein
   the positioning mechanism comprises:
   one of a first convex portion and a first concave portion that is provided in the mounting support member; and
   one of a second concave portion and a second convex portion that is fitted into the one of the first convex portion and the second concave portion, and that is provided in the optical part.

5. The optical transmission module according to claim 4, wherein
   the positioning mechanism is provided with a plurality of the one of the first convex portions and the first concave portions and a plurality of the second concave portions and the second convex portions, respectively.

6. The optical transmission module according to claim 1, wherein the mounting support member is a resin molded product.

7. The optical transmission module according to claim 1, wherein the optical part is a resin molding product.

8. The optical transmission module according to claim 1, wherein
   a plurality of the photoelectric elements are provided; and
   the optical receptacle section fixing a plurality of optical fibers.

9. The optical transmission module according to claim 6, wherein a plurality of photoelectric elements is an integral array.

10. The optical transmission module according to claim 9, wherein the mounting support member individually positions the plurality of photoelectric elements on the electric wiring section.

11. The optical transmission module according to claim 1, wherein the mounting support member comprises an element positioning section containing a hole positioning the photoelectric element.

12. The optical transmission module according to claim 11, wherein
the positioning of the photoelectric element with respect to the mounting support member is mechanically performed by fitting a wall surface of the photoelectric element to a wall surface of the element positioning section.

13. The optical transmission module according to claim 12, wherein the wall surface of the element positioning section comprises an inclined surface.

14. The optical transmission module according to claim 11, wherein the mounting support member comprises a plurality of alignment marks positioning the photoelectric element.

15. The optical transmission module according to claim 9, wherein the mounting support member comprises an element positioning section containing a hole positioning the photoelectric element.

16. The optical transmission module according to claim 15, wherein
the positioning of the photoelectric element with respect to the mounting support member is mechanically performed by fitting a wall surface of the photoelectric element to a wall surface of the element positioning section.

17. The optical transmission module according to claim 16, wherein the wall surface of the element positioning section comprises an inclined surface.

18. The optical transmission module according to claim 15, wherein the mounting support member comprises a plurality of alignment marks positioning the photoelectric element.

19. The optical transmission module according to claim 10, wherein the mounting support member comprises an element positioning section containing a hole positioning the photoelectric element.

20. The optical transmission module according to claim 19, wherein
the positioning of the photoelectric element with respect to the mounting support member is mechanically performed by fitting a wall surface of the photoelectric element to a wall surface of the element positioning section.

21. The optical transmission module according to claim 20, wherein the wall surface of the element positioning section comprises an inclined surface.

22. The optical transmission module according to claim 19, wherein the mounting support member comprises a plurality of alignment marks positioning the photoelectric element.

23. The optical transmission module according to claim 1, wherein the optical part is one of a convex portion and a concave portion fixing a fiber holder holding a plurality of optical fibers.

* * * * *